United States Patent Office 3,014,780
Patented Dec. 26, 1961

3,014,780
CALCINATION OF MAGNESIUM CHLORIDE-AMMONIA COMPLEXES
James A. Clarke, Lake Jackson, Tex., assignor to The Dow Chemical Company, Midland, Mich., a corporation of Delaware
No Drawing. Filed June 22, 1959, Ser. No. 821,640
3 Claims. (Cl. 23—91)

This invention relates to an improvement in the calcination of magnesium chloride-ammonia complexes, and more particularly to an improvement to prevent or to decrease the corrosiveness of the mixture to ferruginous materials.

Numerous methods have been proposed for the preparation of anhydrous magnesium chloride. While anhydrous magnesium chloride may have many uses in the chemical industry, a high percentage of it is used in production of magnesium metal by electrolysis. In recently developed electrolytic baths a high purity anhydrous magnesium chloride is required. Higher efficiencies are obtained with these new electrolytic baths than by prior art processes. However, to realize the improved efficiencies the magnesium chloride and other constituents added to the electrolytic bath must be free of metal contaminants.

While various methods may be used for the production of the magnesium chloride, a convenient method is to precipitate the magnesium as an ammonia complex from a solution of ammonium chloride by addition of ammonia to the solution. The ammonia added reacts with magnesium chloride, forming the complex which precipitates out usually as a magnesium chloride hexammoniate. The precipitate thus recovered is washed free of mother liquor and then heated to a temperature up to around 430° C. to decompose it. Upon decomposition the ammonia vaporizes leaving the magnesium chloride.

In the calcination of the magnesium chloride-ammonia complex obtained by precipitation from a magnesium chloride solution, serious corrosion of the equipment is obtained. This is undesirable not only in that the equipment used for the calcination is rapidly destroyed and must be replaced, but the magnesium chloride product obtained becomes contaminated with iron and other metal impurities from the equipment. The presence of these metals is detrimental to the cell efficiency if the magnesium chloride is used as an electrolyte in magnesium production.

It is therefore an object of this invention to provide a method to inhibit the corrosiveness of a magnesium chloride-ammonia complex during calcination of the mixture. A further object is to provide a method for the preparation of magnesium chloride wherein the iron content of the magnesium chloride product is not increased during the calcination of a magnesium chloride-ammonia complex in ferrous equipment.

The above and other objects are attained, according to the invention, by intermixing magnesium metal in particulate form with the magnesium chloride-ammonia complex prior to calcination.

From the work leading to this invention, it is believed that the cause of the corrosion upon calcination is due to the formation of hydrochloric acid. In the precipitation of the complex from magnesium chloride solutions, a small but significant amount of the magnesium chloride is converted to magnesium hydroxide upon contacting the solution with ammonia. This magnesium hydroxide precipitates out and is intermixed with the complex obtained. Upon calcination, the magnesium hydroxide decomposes to form magnesium oxide and water. It is believed that this water and other water in the feed will react with magnesium chloride present in the mixture to form hydrochloric acid and magnesium oxide. The hydrochloric acid thus obtained then attacks the ferrous walls of the equipment forming ferric chloride. The method by which the magnesium intermixed with the complex during the calcination acts to counteract the corrosion is not definitely known. It may be that the magnesium, in the presence of the catalytic effect of magnesium chloride, reacts directly with the water to form magnesium oxide and hydrogen, or the magnesium may react with the hydrochloric acid preferentially over the ferruginous materials of construction of the kiln or equipment used in the calcination.

While fine particles of magnesium having a particle size in the range of −40 to +100 mesh, U.S. sieve series, may be used, magnesium filings are preferred. The filings are long slender pieces which readily break up during calcination when intermixed with the complex. The amount of magnesium added is generally such that at least an equal molar basis of magnesium to that of water in the mixture is obtained. The amount of magnesium hydroxide or other moisture obtained in the complex may be determined by analytical procedures in order to determine the amount of magnesium to be added. Since in the presence of atmospheric air moisture from the air may be picked up by the product, it may be desirable to use a slight excess of magnesium to account for any possible water pick up. By adding pure magnesium to the complex, an excess of magnesium which will remain in the magnesium chloride final product is not detrimental to the use of the magnesium chloride in electrolytic cells.

The addition of magnesium in particulate form to the magnesium chloride-ammonia complex is effective in inhibiting the corrosion of the calcination equipment even though the calcination of the complex may be effected by different methods or type of equipment. Most often the complex is calcinated in either a rotating kiln or in a fluid bed. In a fluid bed technique, the column in which the complex is fluidized is constructed with internal heaters so that upon fluidization of the complex by use of ammonia or an inert gas the fluidized complex will contact the heated surface during the agitation and mixing obtained in the bed.

To further illustrate the invention, a fluidized bed was used in calcining a $MgCl_2 \cdot 2NH_3$ complex. A cylindrical column 6 inches in diameter and 27 inches high was used in which the complex was fluidized using methane. The column had a gas outlet and a feed inlet at the top and 9 inches of the bottom portion was cone shaped with an inlet for the fluidizing gas. Two 1 inch stainless steel tubes extending the length of the cylindrical column were used as a means of heating the complex within the column to a temperature of about 400° C. Rods wound with heating elements were inserted in the tubes to provide heat electrically.

To 40.9 pounds of $MgCl_2 \cdot 2NH_3$, 126 grams of magnesium filings were added. The magnesium chloride-ammonia complex used contained 0.42 weight percent water and the amount of magnesium filings added represented a molar ratio equivalent to the water present in the feed. The complex intermixed with the magnesium filings was continually fed to the calciner at the rate of 1.5 pounds per hour. The product from the calciner was also continually withdrawn.

The product withdrawn was analyzed for iron content which was used to indicate the corrosion obtained within the calciner. The magnesium chloride-ammonia complex feed composition contained initially approximately 100 p.p.m. of iron. In a 15 hour run, the average iron content of the calcined product was 157 p.p.m.

The run above was repeated except that to the complex feed no magnesium filings were added. After a 15 hour operation, the product contained over 600 p.p.m. of iron.

What is claimed is:
1. In a process for calcining of a solid magnesium chloride-ammonia complex wherein the complex is heated in the presence of moisture to decompose the complex and vaporize the ammonia, the step to inhibit the corrosiveness of the mixture to ferruginous materials which comprises intermixing magnesium in particulate form with the complex in an amount at least equal to that of the moisture present in the complex on a molar basis.

2. In a process for calcining of a solid magnesium chloride-ammonia complex wherein the complex in the presence of water is heated to a temperature in the range of 280 to 450° C. to decompose the complex and vaporize the ammonia, the step to inhibit the corrosiveness of the mixture which comprises intermixing with the complex magnesium particles having a particle size in the range of −40 to +100 mesh, U.S. sieve series in an amount slightly in excess of the water present in the complex on a molar basis.

3. A process according to claim 2 wherein the magnesium intermixed is in the form of magnesium filings.

References Cited in the file of this patent

UNITED STATES PATENTS

| | | |
|---|---|---|
| 1,927,027 | Foulds | Sept. 19, 1933 |
| 1,927,660 | Heath et al. | Sept. 19, 1933 |
| 2,098,431 | Partridge | Nov. 9, 1937 |
| 2,373,912 | Pike | Apr. 17, 1945 |
| 2,413,292 | Christensen | Dec. 31, 1946 |
| 2,694,620 | Lathe | Nov. 16, 1954 |

FOREIGN PATENTS

| | | |
|---|---|---|
| 282,164 | Italy | Feb. 3, 1931 |

OTHER REFERENCES

Mellor: "Comprehensive Treatise on Inorganic and Theoretical Chemistry," vol. 4, pages 267, 268, 305 (1923), Longmans, Green and Co., N.Y.